United States Patent Office 3,253,046
Patented May 24, 1966

3,253,046
POLYFLUOROALKYLATION PROCESS
Fred N. Teumac, Lake Jackson, and Lester W. Harriman, Angleton, Tex., assignors to The Dow Chemical Company, Midland, Mich., a corporation of Delaware
No Drawing. Filed July 26, 1963, Ser. No. 297,966
7 Claims. (Cl. 260—651)

This invention is concerned with a new process for the preparation of polyfluoroalkylated aromatic compounds. It is particularly concerned with the catalyzed reaction of a perfluorinated lower olefin with an aromatic compound of the benzene series.

Polyfluoroalkylated aromatic compounds such as $\alpha,\alpha,\alpha$-trifluorotoluene, (tetrafluoroethyl)toluene, (pentafluoroethyl)benzene, 1,2-dichloro-3-(perfluoroethyl)benzene, and bis(pentafluoroethyl)benzene are liquids of moderately high boiling point and which are characteristically of unusually high thermal stability. These compounds are, therefore, valuable as heat transfer fluids, hydraulic fluids, and the like. They are also softening agents for fluorocarbon polymers. In the past such polyfluoroalkylated aromatics have been prepared by multistep procedures which require rare and expensive intermediates as well as highly toxic and corrosive fluorinating agents. Low yields and costly products are the characteristic results of such methods.

It would be advantageous to have available a simplified and direct process for the preparation of these fluorinated compounds which employs easily available reagents and conventional equipment. The primary object of this invention is to provide such a process.

It has been found that fluorinated alkyl groups, and chiefly perfluoroalkyl groups are joined to an aromatic ring when an alkylatable aromatic compound and a perfluoro lower olefin are contacted at high temperatures in the presence of an alkali metal fluoride. By the term alkylatable aromatic compound is meant one which is reactive in and alkylatable by the Friedel-Crafts reaction. The aromatic compounds included are hydrocarbons such as benzene, toluene, xylene, ethylbenzene, and the like, and also halogenated hydrocarbons such as chlorobenzene, fluorobenzene, dichlorobenzene, $\alpha$-chlorotoluene, and p-bromotoluene. Under preferred conditions, the aromatic compound is a hydrocarbon of the benzene series, the perfluoro olefin is tetrafluoroethylene, and the reaction is carried out in the gas phase at about 280° C. to about 370° C.

When the reaction is carried out under these preferred conditions, the alkylated product is substantially a mixture of the mono and bis(pentafluoroethyl)benzenes. However, there is also a lesser but appreciable degree of substitution with other perfluoroalkyl radicals such as trifluoromethyl and heptafluoroisopropyl radicals during the reaction and benzenes substituted with one or more of these radicals can be separated from the reaction product. In some cases, fluoroalkyl groups such as fluoromethyl and tetrafluoroethyl substituents are also present, usually in small proportions.

The mechanism of this reaction is obscure and evidently complex because of the nature and variety of the products which are formed. An expected product of the reaction of an olefin with a hydrocarbon is the alkylate formed by simple addition. In this case, such an alkylate would be (tetrafluoroethyl)benzene rather than the pentafluoroethyl compound which is the major product. It is known that decomposition takes place during the present process because hydrogen fluoride, carbon, and some low boiling fluorinated compounds are also produced and compounds such as (trifluoromethyl)benzenes and (heptafluoroisopropyl)benzene which are also found in the reaction product could only be formed as a result of some decomposition. The perfluoroalkylated products of this reaction are, therefore, particularly unexpected.

In order to obtain practical yields, it is necessary to employ the reactants within certain molar ratios. A ratio of about 0.8 to about 10 moles of aromatic compound per mole of tetrafluoroethylene is suitable. Lower ratios of aromatic compound are likely to produce excessive polymerization of the tetrafluoroethylene while ratios higher than these result in impractically low reaction rates. Best results are obtained in this reaction when about 1.0–5 moles of aromatic compound are used per mole of tetrafluoroethylene.

While the reaction of tetrafluoroethylene with aromatic compounds can be run effectively at any temperature within the specified limits of about 280-370° C., reaction temperatures in the range 330°–350° C. give optimum results. As the reaction temperature increases above about 370° C., the polymerization of tetrafluoroethylene becomes the major reaction and below about 280° C., the rate of reaction becomes vanishingly small.

Any of the common alkali metal fluorides, i.e., the fluorides of lithium, sodium, potassium, rubidium, or cesium are effective catalysts in the process of this invention. However, the fluorides of rubidium and cesium are more active than those of the lower members of the series and cesium fluoride is most preferred. These catalysts may be employed as the pure compounds in granular or powdered form or they may be used as supported catalysts with the fluoride dispersed on the surface of an inert material such as charcoal, nickel beads, or other support which is relatively inert to hydrogen fluoride and the other reactants under reaction conditions. Either a fixed bed or a fluid catalyst can be used.

The rate of flow of the reactants through the catalyst bed is not a critical factor in determining the success of the reaction, but the rate of reaction is thereby affected. Residence times of about 1–5 seconds have been found to be optimum, the term "residence time" being defined as the average time in which a molecule of reactant is in proximate contact with the catalyst under specified reaction conditions.

The following examples illustrate various modes of operation of the new process.

*Example 1*

The reactor used was a vertically disposed stainless steel pipe of one inch inside diameter within which powdered catalyst was suspended in a nickel container permitting the free flow of gas through the powdered contents. The reactor was heated by an external electric furnace in such a way that the portion of the reactor tube above the catalyst served as a preheat chamber. A thermocouple within the catalyst bed measured the reaction temperature. Measured volumes of benzene and tetrafluoroethylene were admitted at the top of the reactor tube where the benzene was vaporized. The gaseous benzene-tetrafluoroethylene mixture proceeded over and through the catalyst bed and the effluent products passed from the bottom of the reactor through a cold trap which collected condensable materials and the uncondensed gas passed to gas measuring and analyzing apparatus.

The nickel catalyst container was filled with 12.5 cc. of powdered CsF, making a catalyst bed which contained 7.5 cc. of free space. The reactor was heated to 350° C. and benzene at 12 cc. per hour and tetrafluoroethylene at 4 g. per hour were introduced into the top of the reactor. Analysis of the effluent from the bottom of the reactor collected during 6.75 hours of running showed that 5.0% of the benzene had been converted to (perfluoroalkyl)-benzenes. A run made under the same conditions but for a duration of 3 hours showed 5.7% conversion.

Examples 2–5

Additional runs were made using the catalyst and the general procedure of Example 1 but with variations in temperature and feed rates as shown below.

| Run No. | Temp. °C. | Feed Rate, g./hr. | | Percent Conversion of Benzene |
|---|---|---|---|---|
| | | $C_2F_4$ | Benzene | |
| 2 | 350 | 5.7 | 10.5 | 10 |
| 3 | 350 | 8 | 10.5 | [1] 16 |
| 4 | 300 | 8 | 10.5 | 2.8 |
| 5 | 280 | 8 | 10.5 | <1 |

[1] After several hours running, the reactor became blocked with polymerized $C_2F_4$. At 350° C., higher conversions were obtained but at the cost of increased polymer formation. Rapid polymer formation prevented operation at any feedrate when the reactor temperature was raised to 380° C.

The condensed products of Runs 1–4 were combined and distilled. From 188.7 g. of condensate there were obtained 150.0 g. of unreacted benzene and 38.3 g. of higher boiling material. This fraction was separated into its components by vapor phase chromatography and these components were identified by mass spectrometry and infrared examination. The following compounds were isolated and characterized:

| | G. |
|---|---|
| α,α,α-Trifluorotoluene | 3.4 |
| (Pentafluoroethyl)benzene | 27.7 |
| (Heptafluoroisopropyl)benzene | 0.1 |
| o-Pentafluoroethyl-α,α,α-trifluorotoluene | 0.7 |
| p-Pentafluoroethyl-α,α,α-trifluorotoluene | 0.6 |
| o-Bis(pentafluoroethyl)benzene | 0.6 |
| p-Bis(pentafluoroethyl)benzene | 1.0 |

Examples 6–8

Other alkali metal fluorides were used to catalyze the reaction. The procedure was similar to that of Example 1.

| Run No. | Catalyst | Temp., °C. | Feed Rate, g./hr. | | Percent Conversion of Benzene |
|---|---|---|---|---|---|
| | | | $C_2F_4$ | Benzene | |
| 6 | NaF | 350 | 5.7 | 10.5 | <1 |
| 7 | KF | 350 | 5.7 | 10.5 | 1.2 |
| 8 | RbF | 350 | 5.7 | 10.5 | 3.9 |

The products of these reactions were (perfluoroalkyl)-benzenes as found in Runs 1–4.

Example 9

By the procedure of Example 1, 5.7 g./hr. of tetrafluoroethylene and 10.4 g./hr. of toluene were passed as mixed vapors over a cesium fluoride catalyst at 320° C. Somewhat less than 10% of the toluene feed was converted to alkylated products. These products were found to be largely the ortho and para isomers of tetrafluoroethyl-α-fluorotoluene and pentafluoroethyltoluene.

Examples 10–12

In the same way, mixtures of tetrafluoroethylene with α-chlorotoluene, o-dichlorobenzene, and bromobenzene respectively in similar molar proportions were passed over a CsF catalyst at temperatures of 280–330° C. Conversions of these halides were lower than the conversions found with the corresponding hydrocarbons, but sufficient alkylated product was obtained in each case to permit identification of the individual compounds produced. The product obtained from α-chlorotoluene was essentially the ortho and para isomers of pentafluoroethyl-α-fluorotoluene, the product from o-dichlorobenzene was largely 1,2-dichloro-3-(pentafluoroethyl)benzene and 1,2-dichloro-4-(pentafluoroethyl)benzene, and the product from bromobenzene was essentially a mixture of ortho and para bromo(pentafluoroethyl)benzene.

Example 13

A blank run was made wherein the space normally occupied by the catalyst was filled with nickel screen. Using feed rates of benzene and tetrafluoroethylene as shown in Example 1, no reaction was observed at temperatures below about 560° C. Between 560° and 600° C., decomposition took place and quantities of HF were liberated. No alkylated products were identified.

We claim:

1. A process for the nuclear polyfluoroalkylation of an aromatic compound which comprises reacting by contacting about 0.8 to about 10 moles of an aromatic compound selected from the group consisting of aromatic hydrocarbons of the benzene series and their partially halogenated analogs with 1 mole of tetrafluoroethylene in the gas phase at about 280° C. to about 370° C. in the presence of an alkali metal fluoride wherein the alkali metal has an atomic number of 11–55.

2. The process of claim 1 wherein the aromatic compound is an aromatic hydrocarbon.

3. The process of claim 2 wherein the aromatic hydrocarbon is benzene.

4. The process of claim 2 wherein the aromatic hydrocarbon is toluene.

5. The process of claim 2 wherein the alkali metal fluoride is cesium fluoride.

6. A process for making (pentafluoroethyl)benzene which comprises reacting by contacting 1.0–5 moles of benzene with one mole of tetrafluoroethylene in the gas phase at about 280° C. to about 370° C. in the presence of cesium fluoride.

7. A process for making a polyfluoroethyltoluene which comprises reacting by contacting 1.0–5 moles of toluene with 1 mole of tetrafluoroethylene in the gas phase at about 280° C. to about 370° C. in the presence of cesium fluoride.

References Cited by the Examiner

UNITED STATES PATENTS

| 2,862,974 | 12/1958 | Sieglitz et al. | 260—651 |
| 3,052,733 | 9/1962 | Olah et al. | 260—651 |

LEON ZITVER, *Primary Examiner.*